US009571482B2

(12) United States Patent
Gupta et al.

(10) Patent No.: US 9,571,482 B2
(45) Date of Patent: Feb. 14, 2017

(54) SECURE ON-LINE SIGN-UP AND PROVISIONING FOR WI-FI HOTSPOTS USING A DEVICE MANAGEMENT PROTOCOL

(75) Inventors: Vivek Gupta, San Jose, CA (US); Necatl Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/188,205

(22) Filed: Jul. 21, 2011

(65) Prior Publication Data
US 2013/0024921 A1    Jan. 24, 2013

(51) Int. Cl.
H04L 29/06    (2006.01)
H04W 12/06    (2009.01)
(Continued)

(52) U.S. Cl.
CPC ....... H04L 63/0823 (2013.01); H04L 41/0806 (2013.01); H04L 41/28 (2013.01);
(Continued)

(58) Field of Classification Search
CPC ...... H04W 4/001; H04W 12/06; H04W 76/02; H04W 76/022; H04W 76/027; H04W 84/12; H04L 9/3202; H04L 9/321–9/3215; H04L 41/0806–41/0809; H04L 41/28; H04L 63/08; H04L 63/0815; H04L 63/0823; H04L 63/0884; H04L 63/0892; H04L 63/164–63/166; H04L 63/18; H04L 67/02; H04L 67/125
See application file for complete search history.

(56) References Cited

U.S. PATENT DOCUMENTS 8,352,643 B2    1/2013   Birnbaum
8,838,070 B2    9/2014   Zhang et al.
(Continued)

FOREIGN PATENT DOCUMENTS

CN    101262670 A    9/2008
CN    103688565 A    3/2014
(Continued)

OTHER PUBLICATIONS

Wireless Broadband Alliance. "WISPr 2.0". Doc Ref. No. WBA/RM/WISPr Version 01.00. Published: Apr. 8, 2010.*
(Continued)

*Primary Examiner* — Linglan Edwards
*Assistant Examiner* — Kevin Bechtel
(74) *Attorney, Agent, or Firm* — Schwegman Lundberg & Woessner, P.A.

(57) ABSTRACT

Embodiments of a mobile device and method for secure on-line sign-up and provisioning of credentials for Wi-Fi hotspots are generally described herein. In some embodiments, the mobile device may be configured to establish a transport-layer security (TLS) session with a sign-up server through a Wi-Fi Hotspot to receive a certificate of the sign-up server. When the certificate is validated, the mobile device may be configured to exchange device management messages with the sign-up server to sign-up for a Wi-Fi subscription and provisioning of credentials, and retrieve a subscription management object (MO) that includes a reference to the provisioned credentials for storage in a device management tree. The credentials are transferred/provisioned securely to the mobile device. In some embodiments, an OMA-DM protocol may be used. The provisioned credentials may include certificates in the case of certificate-based credentials, machine-generated credentials such as username/password credentials, or SIM-type credentials.

20 Claims, 4 Drawing Sheets

(51) Int. Cl.
*H04W 4/00* (2009.01)
*H04L 29/08* (2006.01)
*H04L 12/24* (2006.01)
*H04W 84/12* (2009.01)
*H04W 76/02* (2009.01)

(52) U.S. Cl.
CPC .......... *H04L 63/164* (2013.01); *H04L 67/125* (2013.01); *H04W 4/001* (2013.01); *H04W 12/06* (2013.01); *H04L 67/02* (2013.01); *H04W 76/022* (2013.01); *H04W 84/12* (2013.01)

(56) References Cited

U.S. PATENT DOCUMENTS

| | | | |
|---|---|---|---|
| 9,307,408 | B2 | 4/2016 | Gupta et al. |
| 2004/0210468 | A1 | 10/2004 | Rubel et al. |
| 2006/0072527 | A1 | 4/2006 | Beck et al. |
| 2006/0173976 | A1 | 8/2006 | Vincent et al. |
| 2007/0066306 | A1* | 3/2007 | Cheng ............ H04L 63/06 455/445 |
| 2007/0294385 | A1 | 12/2007 | Kapadekar et al. |
| 2008/0140814 | A1 | 6/2008 | Cohen |
| 2008/0220741 | A1 | 9/2008 | Hung |
| 2008/0225805 | A1 | 9/2008 | Pearson et al. |
| 2009/0199281 | A1 | 8/2009 | Cai et al. |
| 2009/0260070 | A1 | 10/2009 | Soliman |
| 2010/0031029 | A1* | 2/2010 | Ilyadis ............ 713/156 |
| 2011/0055411 | A1 | 3/2011 | Taaghol |
| 2011/0154454 | A1* | 6/2011 | Frelechoux ............ 726/5 |
| 2011/0269449 | A1 | 11/2011 | Kazmi et al. |
| 2012/0047245 | A1* | 2/2012 | Zhou et al. ............ 709/223 |
| 2012/0149334 | A1* | 6/2012 | Zhang ............ H04L 63/0838 455/411 |
| 2012/0203824 | A1* | 8/2012 | Oommen ............ 709/203 |
| 2012/0210404 | A1 | 8/2012 | Patil et al. |
| 2012/0284785 | A1* | 11/2012 | Salkintzis et al. ............ 726/7 |
| 2013/0007853 | A1 | 1/2013 | Gupta et al. |
| 2013/0232561 | A1 | 9/2013 | Gupta et al. |
| 2013/0298209 | A1 | 11/2013 | Targali et al. |
| 2014/0029512 | A1 | 1/2014 | Chu et al. |
| 2014/0134980 | A1 | 5/2014 | Singh et al. |
| 2014/0185597 | A1 | 7/2014 | Gupta et al. |

FOREIGN PATENT DOCUMENTS

| | | |
|---|---|---|
| CN | 104982072 A | 10/2015 |
| CN | 105635165 A | 6/2016 |
| EP | 2673988 A1 | 12/2013 |
| JP | 2006523412 A | 10/2006 |
| JP | 2014526726 A | 10/2014 |
| WO | WO-2004084465 A2 | 9/2004 |
| WO | WO-2007024400 A2 | 3/2007 |
| WO | WO-2010124162 A2 | 10/2010 |
| WO | WO-2012036992 A2 | 3/2012 |
| WO | WO-2012107639 A1 | 8/2012 |
| WO | WO-2012110694 A1 | 8/2012 |
| WO | WO-2013013040 A2 | 1/2013 |
| WO | WO-2013013040 A3 | 1/2013 |
| WO | WO-2013066348 A1 | 5/2013 |
| WO | 2012107639 | 8/2013 |
| WO | WO-2014105114 A1 | 7/2014 |
| WO | WO-2014123576 A1 | 8/2014 |

OTHER PUBLICATIONS

Wi-Fi Alliance. "WPA™ Deployment Guidelines for Public Access Wi-Fi® Networks". <http://www.paratorpes.es/cisco/WPA_for_Public_Access_Final.pdf> Published: Oct. 28, 2004.*
"WiMAX® Over-The-Air Provisioning & Activation Protocol based on OMA DM Specifications", Stage 2 and Stage 3: Detailed Protocols and Procedures, Release 1.5, Version 1.0.0., Pub: Mar. 26, 2008.*
"A new program from the Wi-Fi Alliance to enable seamless Wi-Fi access in hotspots", Wi-Fi Certified Passpoint, (Jun. 2012), 11 pgs.
"Hotspot 2.0 (Release 2) Technical Specification: Version 1.20a", Wi-Fi Alliance Technical Committee Hotspot 2.0 Technical Task Group, (2012), 145 pgs.
"Interational Application Serial No. PCT/US2011/059367, Writtion Opinion mailed Apr. 24, 2012", 5 pgs.
"International Application Serial No. PCT/US2011/059367, International Search Report mailed Apr. 24, 2012", 3 pgs.
"International Application Serial No. PCT/US2012/047403, International Search Report mailed Jan. 21, 2013", 3 pgs.
"International Application Serial No. PCT/US2012/047403, Written Opinion mailed Jan. 21, 2013", 4 pgs.
"Korean Application Serial No. 10-2012-57704, Office Action mailed Aug. 17, 2012", w/English Translation, 5 pgs.
"Korean Application Serial No. 10-2012-57704, Response filed Oct. 17, 2012 to Office Action mailed Aug. 17, 2012", w/English Translation, 21 pgs.
"The Future of Hotspots: Making Wi-Fi as Secure and Easy to Use as Cellular", Cisco, White Paper, (2012), 9 pgs.
"Wi-Fi Certified Passpoint", Xirrus White Paper, (2012), 5 pgs.
"Wi-Fi Certified Passpoint (Release 1) Deployment Guidelines", Wi-Fi Alliance Hotspot 2.0 Technical Task Group. Version 1.0, (Oct. 2012), 25 pgs.
"Wi-Fi Certified Passpoint Architecture for Public Access", Aruba White Paper, (2011), 15 pgs.
"U.S. Appl. No. 13/512,105, Non Final Office Action mailed Aug. 15, 2013", 10 pgs.
"International Application Serial No. PCT/US2013/044238, International Search Report mailed Aug. 27, 2013", 3 pgs.
"International Application Serial No. PCT/US2013/044238, Written Opinion mailed Aug. 27, 2013", 6 pgs.
"International Application Serial No. PCT/US2013/052743, International Search Report mailed Nov. 1, 2013", 3 pgs.
"International Application Serial No. PCT/US2013/052743, Written Opinion mailed Nov. 1, 2013", 5 pgs.
Aboba, Bernard, "IEEE P802.11 Wireless LANs: Virtual Access Points", [Online]. Retrieved from the Internet: <URL: http://aboba.drizzlehosting.com/IEEE/11-03-154r1-I-Virtual-Access-Points.doc>, (May 22, 2003), 13 pgs.
Nie, Pin, et al., "Flexible Single Sign-On for SIP: Bridging the Identity Chasm", IEEE International Conference on Communications, 2009. ICC'09., (2009), 1-6.
Pfitzmann, Birgit, "Privacy in enterprise identity federation—policies for Liberty 2 single sign on pet 2003", Proc. 3rd Workshop on Privacy Enhancing Technologies (PET 2003)., (2003), 1-19.
"U.S. Appl. No. 13/512,105, Final Office Action mailed Jan. 22, 2014", 12 pgs.
"U.S. Appl. No. 13/512,105, Response filed Dec. 16, 2013 to Non Final Office Action mailed Aug. 15, 2013", 10 pgs.
"U.S. Appl. No. 14/124,767, Preliminary Amendment filed Dec. 6, 2013", 9 pgs.
"International Application Serial No. PCT/US2012/047403, International Preliminary Report on Patentability mailed Jan. 21, 2014", 5 pgs.
"U.S. Appl. No. 13/512,105, Preliminary Amendment filed May 25, 2012", 3 pgs.
"International Application Serial No. PCT/US2011/059367, International Preliminary Report on Patentability mailed May 15, 2014", 7 pgs.
Extended European Search Report received for European Patent Application No. 12814178.5, mailed Apr. 9, 2015, 11 pages.
"WiMAX Over-The-Air General Provisioning System Specification", WiMAX Forum® Network Architecture, Architecture, detailed Protocols and Procedures, WMF-T33-103-R015v02, (Nov. 21, 2009), 32 pages, author unknown.
Chacko, Cinu, OTA-DM (Over the Air Device Management), <http://hostdocs.ittoolbox.com/cc012507.pdf>, Feb. 2007, 4 pages.
"WiMAX Over-The-Air General Provisioning System Specification based on OMA DM Specifications", WiMAX Forum® Network Architecture, Architecture, detailed Protocols and Procedures, WMF-T33-104-R015v02, (Nov. 21, 2009), pp. 1-40, author unknown.

(56) References Cited

OTHER PUBLICATIONS

"WiMAX Over-The-Air General Provisioning System Specification based on OMA DM Specifications", WiMAX Forum® Network Architecture, Architecture, detailed Protocols and Procedures, WMF-T33-104-R015v02, (Nov. 21, 2009), pp. 41-80, author unknown.

"U.S. Appl. No. 13/728,606, Notice of Allowance mailed Nov. 25, 2015", 7 pgs.

"U.S. Appl. No. 13/728,606, Response filed Oct. 2, 2015 to Non Final Office Action mailed Jul. 2, 2015", 7 pgs.

"U.S. Appl. No. 14/124,767, Advisory Action mailed Feb. 24, 2016", 3 pgs.

"U.S. Appl. No. 14/124,767, Final Office Action mailed Nov. 30, 2015", 36 pgs.

"U.S. Appl. No. 14/124,767, Response filed Feb. 1, 2016 to Final Office Action mailed Nov. 30, 2015", 12 pgs.

"U.S. Appl. No. 14/124,767, Response filed Oct. 29, 2015 to Non Final Office Action mailed Aug. 13, 2015", 10 pgs.

"Chinese Application Serial No. 201380060673.X, Voluntary Amendment filed Oct. 28, 2015", w/ English Claims, 17 pgs.

"European Application Serial No. 12814178.5, Extended European Search Report mailed Apr. 9, 2015", 10 pgs.

"European Application Serial No. 12814178.5, Response filed to Oct. 15, 2015 Extended European Search Report mailed Apr. 9, 2015", 26 pgs.

"European Application Serial No. 13874312.5, Preliminary Amendment filed Jul. 2, 2015", 9 pgs.

"International Application Serial No. PCT/US2013/052743, International Preliminary Report on Patentability mailed Aug. 20, 2015", 7 pgs.

"Japanese Application Serial No. 2015-543034,Voluntary Amendment mailed Mar. 14, 2016", English Claims, 11 pgs.

"WiMAX Forum Network Architecture (Stage 2 and Stage 3: Detailed Protocols and Procedures)[WiMAX Over-The-Air Provisioning & Activation Protocol based on OMA DM Specifications", Wimax Forum Network Architecture—Wimax Over-The-Air Provisioning & Activation Protocol Based on Oma Dm Specifications, vol. Release 1.5, no. Version 1.0.0, (Mar. 26, 2008), 83 pgs.

"Wirnax Forum Network Architecture-Architecture, detailed Protocols and Procedures-WIMAX Over-the-Air General Provisioning System Specification", Wimax Forum, [Online]. Retrieved from the Internet: <URL:http://resources.wimaxforum.org/sites/wimaxforum.org/files/technical_document/2011/01/WMF-T33-103-R015v02_OTA-General.pdf>, (Nov. 22, 2009), 32 pgs.

Cinu, Chacko, "OTA-DM (Over the Air Device Management)", [Online]. Retrieved from the Internet: <http://hosteddocs.ittoolbox.com/CC012507.pdf>, (Feb. 2, 2007), 4 pgs.

"U.S. Appl. No. 14/124,767, Notice of Allowance mailed Jun. 14, 2016", 12 pgs.

"U.S. Appl. No. 14/580,839, Non Final Office Action mailed Aug. 11, 2016", 7 pgs.

"Chinese Application Serial No. 201280036196.9, Office Action mailed Jul. 21, 2016", W/Machine Translation, 14 pgs.

"European Application Serial No. 13867091.4, Extended European Search Report mailed Jun. 16, 2016", 6 pgs.

"European Application Serial No. 13874312.5, Extended European Search Report mailed Aug. 16, 2016", 10 pgs.

"Japanese Application Serial No. 2015-543034, Office Action mailed Apr. 19, 2016", With English Translation, 7 pgs.

"Network Architecture Architecture, detailed Protocols and Procedures WiMAX® Over-The-Air General Provisioning System Specification", WMF-T33-103-R015v03, (Nov. 30, 2010), 29 pgs.

"WiMAX Forum Network Architecture (Stage 2 and Stage 3: Detailed Protocols and Procedures)[WiMAX Over-The-Air Provisioning & Activation Protocol based on OMA DM Specifications", WMF-T33-104-R015v02, (Mar. 26, 2008).

\* cited by examiner

OMA-DM TREE

SECURE ON-LINE SIGN-UP AND PROVISIONING FOR WI-FI HOTSPOTS USING A DEVICE MANAGEMENT PROTOCOL

RELATED APPLICATION

This application is related to U.S. patent application Ser. No. 13/173,338, entitled "MOBILE DEVICE AND METHOD FOR AUTOMATIC CONNECTIVITY, DATA OFFLOADING AND ROAMING BETWEEN NETWORKS," filed Jun. 30, 2011.

TECHNICAL FIELD

Embodiments pertain to wireless fidelity (Wi-Fi) networks. Some embodiments pertain to secure on-line sign-up and provisioning of credentials for service and connectivity. Some embodiments relate to secure on-line sign-up and provisioning using a device-management protocol such as an Open Mobile Alliance Device-Management (OMA-DM) protocol. Some embodiments relate to Hotspot 2.0 networks and the Hotspot 2.0 evolution.

BACKGROUND

One issue with subscription establishment with a service provider for Wi-Fi network access is that it is not a simple and user-friendly process. There is no standardized process for secure on-line sign-up and provisioning credentials for Wi-Fi enabled devices and networks. Users generally may have to confront web pages of different types, enter information and select their usernames/passwords at different locations.

Another issue with subscription establishment is security. Open networks may not provide the necessary security while secure networks (such as those that are 802.1x enabled) may prohibit access to non-registrants. Current online sign-up mechanisms expose users to great security risks such as getting their credit card and personal information stolen (e.g., thru well-known honey-pot, twin-evil security holes).

Another issue with subscription establishment is the different types of credentials that are to be provisioned. Some devices or networks may require certificate-based credentials while some other devices or networks may simply require username/password credentials. Other devices or networks may require subscriber-information module (SIM) type credentials (e.g., generally used for some cellular networks).

Thus, there are general needs for secure on-line sign-up and provisioning of credentials. There are also general needs for secure on-line sign-up and provisioning of credentials securely using on-line sign systems that use a device-management protocol as a transport. There are also general needs for a standardized process for secure on-line sign-up that is suitable for provisioning different types of credentials such as username/password credentials, SIM type credentials and certificate-based credentials. There are also general needs for a standardized process for secure on-line sign-up and provisioning of credentials that is suitable for use in any 802.11 based network including both open and secure networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
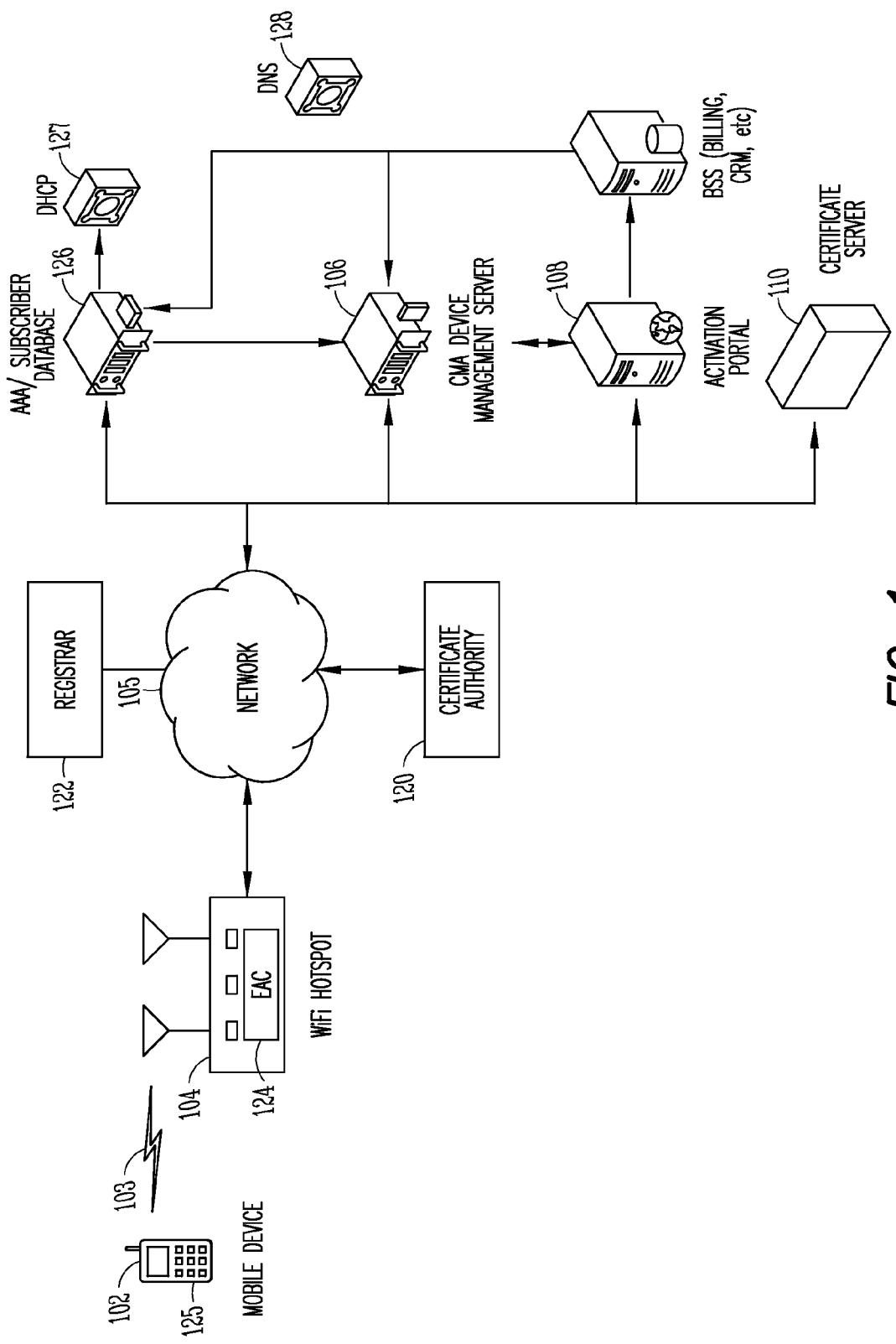
FIG. 1 illustrates an operational environment of network elements for secure on-line sign-up and provisioning of credentials in accordance with some embodiments.

FIG. 1 illustrates an operational environment of network elements for secure on-line sign-up and provisioning of credentials in accordance with some embodiments. Mobile device 102 may be a Wi-Fi enabled device that is configured to associate with a Wi-Fi hotspot 104 and perform the various operations described herein for secure on-line sign-up and provisioning. The Wi-Fi hotspot 104 may provide Internet access over a wireless local area network (WLAN) with a router connected to a link to an Internet service provider. The Wi-Fi hotspot 104 may be part of a Wi-Fi network and may be coupled to a network 105, such as the Internet or through a gateway to other various network elements including a certificate authority 120, a sign-up server 106, an activation portal 108, a certificate enrollment server 110, and a registrar 122 among others. In some embodiments, the sign-up server 106 may be an OMA-DM server that is configured to implement an OMA-DM protocol. The Wi-Fi hotspot 104 may operate as a Wi-Fi access point (AP). The mobile device 102 may include a device management client 125 to implement a device-management protocol, such as OMA-DM, and perform various operation described herein.

In some embodiments, the Wi-Fi hotspot 104 may include an embedded access controller (EAC) 124 to serve as a management entity for the Wi-Fi hotspot 104. The EAC 124 may manage several access points of the Wi-Fi network and may operate as a gateway for a WLAN access network to provide access to other networks such as the Internet. The EAC 124 may perform various operations described here to allow mobile devices access to a Wi-Fi network.

In accordance with embodiments, the mobile device 102 may be configured for secure on-line sign-up and provisioning of credentials for Wi-Fi hotspots. In some embodiments, the mobile device 102 may be configured for secure on-line sign-up and provisioning for Wi-Fi hotspots using a device management protocol, such as the OMA-DM protocol. In these embodiments, the mobile device 102 and sign-up server 106 may exchange request and response messages that are configured in accordance with the OMA-DM protocol. These messages are referred to as OMA-DM package 1 messages, OMA-DM package 2 messages, OMA-DM package 3 messages, and OMA-DM package 4 messages. The OMA-DM protocol may be specified by the OMA-DM Working Group and the Data Synchronization (DS) Working Group in an OMA-DM specification.

In some embodiments, the secure on-line sign-up and provisioning process described herein allows users to establish a subscription with a service provider and download credentials and operator policy onto a client device, such as the mobile device 102, in a secure manner using the OMA-DM protocol as a transport. This may allow cellular-type network service providers that may already be implementing an OMA-DM protocol in their backend core networks to use the same servers and installed components to extend that functionality for servicing Wi-Fi networks. In this way, Wi-Fi networks may operate along with the same cellular-network backend core enabling Wi-Fi offloading from the cellular-type networks in a more seamless and transparent manner. A cellular-type network may refer to any 2G (e.g., GSM (Global System for Mobile Communications), EDGE (Enhanced Data rates for GSM Evolution)) or 3G (e.g., 3GPP (The Third Generation Partnership Project), 3GPP2 (The Third Generation Partners Project 2)) or 4G (e.g., WiMAX (Worldwide Interoperability for Microwave Access), LTE (Long-Term Evolution)) configured network.

Some embodiments provide a standardized process for secure on-line sign-up and provisioning credentials including username/password credentials, certificate-based credentials and SIM-type credentials. The standardized process for secure on-line sign-up and provisioning credentials may use an OMA-DM protocol in any IEEE 802.11-based network making the process applicable to both open and secure networks. A secure Wi-Fi network, for example, may implement security in accordance with a robust-security network (RSN) protocol. Such a network may be considered an RSN network (i.e., a security network that allows the creation of robust security network associations (RSNAs)).

Accordingly, users no longer have to confront web pages of different types and enter information and select their usernames/passwords at different locations. Wi-Fi networks may now be easier to use and are more secure. The use of an OMA-DM protocol allows Wi-Fi network operations to be easily integrated with current and future cellular-type networks. In some embodiments, secure on-line sign-up and provisioning of credentials may be performed automatically and without user interaction.

In accordance with embodiments, the mobile device 102 may be configured with registrar information, such as the URL (uniform resource locator) of the registrar 122. The registrar 122 may contain service provider entries, which may include the service provider fully qualified domain name (FQDN), the service provider friendly name, and the service provider on-line sign-up root trust. The registrar 122 may provide cryptographic binding between the service-provider domain name and other data. The registrar 122 may be used by the mobile device 102 to establish a trust relationship between the mobile device 102 and an online sign-up server, such as sign-up server 106. When the mobile device 102 initiates on-line sign-up, it may query the registrar 122 for metadata of the on-line sign-up server and may verify the authenticity of the on-line sign-up service provider. The mobile device 102 may also download the registry information in advance and may store it locally and use it when it initiates the secure on-line sign-up and provisioning process described herein. If the mobile device 102 is a dual-mode mobile device (having both cellular network capability and Wi-Fi network capability), the mobile device 102 may also be configured to query the registrar 122 in real-time using a cellular-network connection to retrieve on-line sign-up server information and verify authenticity.

In accordance with embodiments, the mobile device 102 may be configured to associate with a Wi-Fi hotspot 104 of a Wi-Fi network and establish a transport-layer security (TLS) session with the sign-up server 106 through the Wi-Fi hotspot 104 to receive a digital certificate of the sign-up server 106. The mobile device 102 may also be configured to send a client-initiated OMA-DM package 1 message to the sign-up-server 106. The OMA-DM package 1 message may include device information and a generic alert that is set to subscription creation. An OMA-DM package 2 message that includes a Launch-Browser-to-URL (Uniform Resource Locator) command for execution by the mobile device 102 may be received from the sign-up server 106 in response to the package 1 message.

Upon receipt of the OMA-DM package 2 message, a secure Hypertext Transfer Protocol (HTTPS) connection to a URL identified in the OMA-DM package 2 message may be established by the mobile device 102 by executing the Launch-Browser-to-URL command and sending an HTTPS GET request over the secure HTTP connection to the identified URL. The URL may be associated with the activation portal 108. The mobile device 102 may exchange information over the established secure HTTP connection with the activation portal 108 to provision a subscription for Wi-Fi network access and create a subscription management object (MO). The subscription MO may include a reference to the type of credentials (e.g., username/password, SIM-type or certificate-based) that have been provisioned for automatic connectivity to certain Wi-Fi networks including Hotspot 2.0 networks.

In the case of username/password credentials, the subscription MO may include a username and password. In the case of SIM-type credentials, the subscription MO may include at least some basic information about the SIM-type credentials. In the case of certificate-based credentials, the subscription MO may include information for accessing certificate-based credentials. These embodiments are described in more detail below.

Although many embodiments are described herein for secure on-line sign-up and provisioning for Wi-Fi Hotspot 2.0 networks, the scope of the invention is not limited in this respect. Other embodiments are applicable to secure on-line sign-up and provisioning for other types of networks including other wireless local-area networks (WLANs) and cellular-type networks.

In accordance with some embodiments, the certificate authority 120 may be a Hotspot 2.0 Certificate Authority (CA) (i.e., the Root Trust) and may be configured to issue certificates including Hotspot 2.0 certificates. The registrar 122 may be where a company or organization that may be registered as a Hotspot 2.0 service provider. The registrar 122 may include an already registered FQDN and/or a chosen friendly name. The FQDN owner may be identified in a publically available "WHOIS" database. The chosen friendly name should not be similar or confused with already registered friendly names. The registrar 122 may invoke rules for registration that may allow the rejection of a requested friendly name, if not appropriate. The registrar 122 may maintain the database of registered service providers along with their friendly names and remove invalid entries. A Hotspot 2.0 certificate from the certificate authority 120 may only be issued to a registered entity (i.e., registered with the registrar database). The certificate may have a lifetime that does not exceed the FQDN registration lifetime. In some cases, the registrar 122 may also act as a certificate authority.

In accordance with embodiments, the mobile device 102 may obtain one or more Hotspot 2.0 root certificate(s) from the certificate authority 120 and the root certificate may identify the server's FQDN and indicate that it is usable for HTTPS based authentication for on-line sign-up and provisioning of credentials. The Hotspot 2.0 service provider may provision the on-line sign-up server 106 with certificates from the certificate authority 120 and may provision appropriate policy settings on the on-line sign-up server 106. These embodiments are discussed in more detail below.

A service provider's network may also include an authentication, authorization, and accounting (AAA) server 126 that includes, among other things, a subscriber database. The AAA server 126 may communicate with network elements such as a Dynamic Host Configuration Protocol (DHCP) server 127 for dynamic allocation of IP addresses and Domain Name Server (DNS) 128 for domain-name translation, as well as performing other networking operations.

In some embodiments, the Wi-Fi hotspot 104 may be a Wi-Fi Hotspot 2.0 operating in accordance with a Hotspot 2.0 evolution specification, such as the Hotspot 2.0 evolution specification of the Wi-Fi Alliance. The mobile device 102 may be a Hotspot 2.0 enabled device and the subscription information may include pre-provisioned subscription information for automatic connection to a Wi-Fi Hotspot 2.0. A Wi-Fi network may be a wireless network including a Wi-Fi hotspot configured to operate in accordance with one of the IEEE 802.11 standards (and amendments thereto) for WLANs.

A Wi-Fi network may use a carrier-sense multiple access technique with collision avoidance (CSMA/CA) in which upstream and downstream communications use the same frequency channels in accordance with a time-division multiplexed process. Some Wi-Fi networks may use orthogonal frequency division multiplexing (OFDM). Cellular networks, on the other hand, such as 4G LTE networks and WiMAX networks, implement an orthogonal-frequency division multiple access (OFDMA) technique. 3G cellular networks may use a code-division multiple access (CDMA) technique. In some embodiments, the mobile device 102 may be a dual-mode device having physical-layer circuitry configured for communicating with both Wi-Fi and cellular networks.

Figure 2:
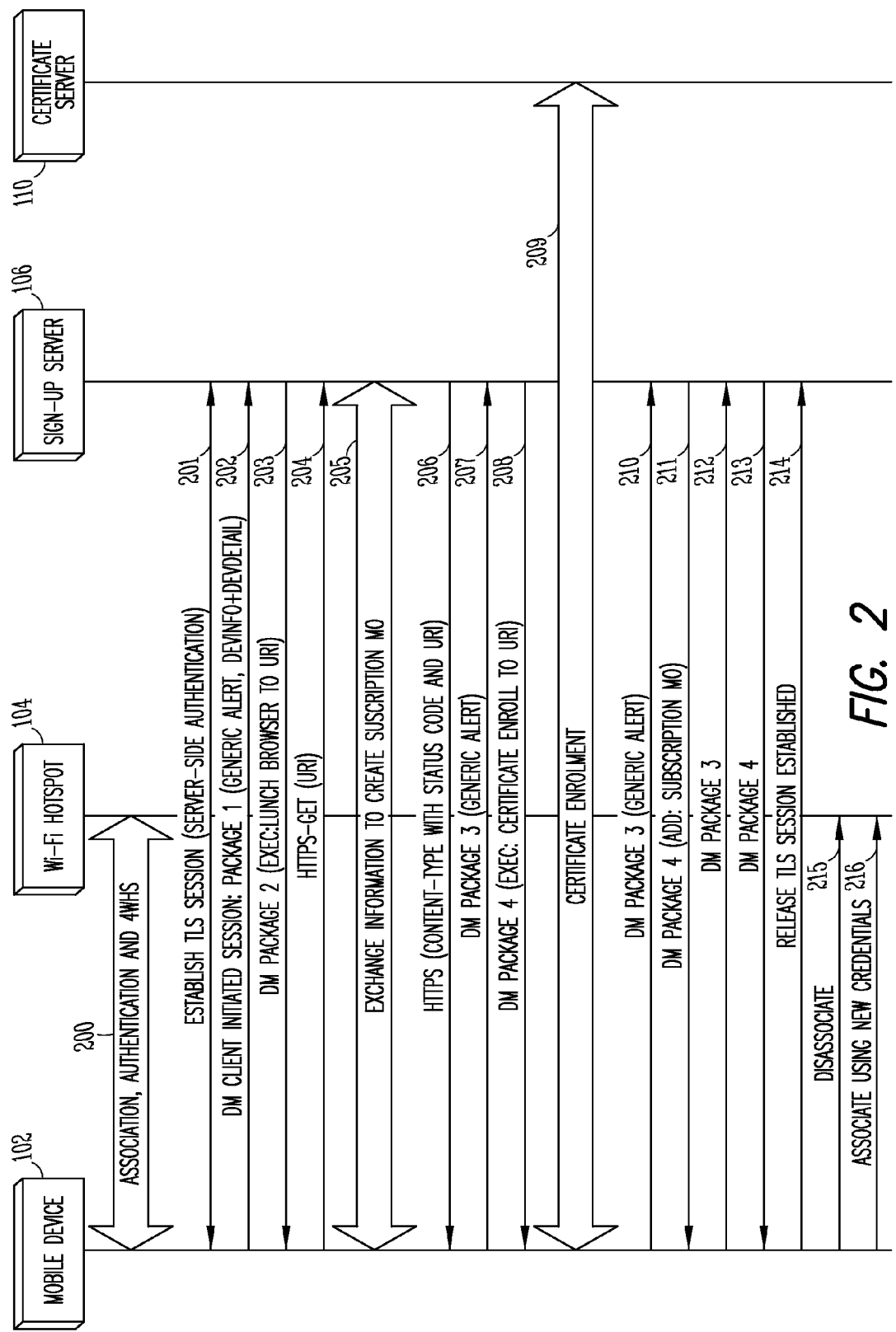
FIG. 2 illustrates the messages exchanged between some network elements for secure on-line sign-up and provisioning of credentials in accordance with some embodiments.

FIG. 2 illustrates messages exchanged between some network elements as part of a procedure for secure on-line sign-up and provisioning of credentials in accordance with some embodiments. Some operations of the procedure may be performed the device management client 125 (FIG. 1) of the mobile device 102, while other operations may be performed by the embedded access controller 126 (FIG. 1) of the Wi-Fi hotspot 104 (FIG. 1), the sign-up server 106 and the certificate enrollment server 110.

In operation 200, the mobile device 102 may associate with a Wi-Fi hotspot 104. In some embodiments, the mobile device 102 may initially scan for Hotspot 2.0 enabled networks and may also look for indications in the beacon of a Wi-Fi hot spot to determine if the Wi-Fi network is secure (e.g., RSN-enabled and whether it has support for Hotspot 2.0 connectivity. The mobile device 102 may select the most appropriate network based on user preferences. If the mobile device 102 determines that it does not have a subscription with the selected service provider, it may be configured to automatically engage in on-line sign-up and provisioning (i.e., without user intervention) as discussed in more detail below.

For RSN enabled networks, the mobile device 102 may be configured to access the RSN-enabled network without credentials. In these embodiments, the mobile device 102 may be configured to send a generic server access (GAS) request (such as an IEEE 802.11u based GAS request) to request an on-line sign-up Network Access Identifier (NAI). The on-line sign-up NAI may be received from the network using the GAS query. After receiving the NAI, the mobile device 102 may use the NAI in an Extensible Authentication Protocol (EAP) authentication process to indicate to the network that it intends to sign-up for service and create credentials for provisioning. The network may be configured to allow access to the mobile device 102 for this purpose without requiring user authentication. The mobile device 102 may then perform server-side authentication as discussed in more detail below in operation 201.

In some embodiments, operation 200 may include performing a four-way handshake (4WHS) to allow the mobile device 102 and the authenticator to derive session keys from a master key generated after the EAP authentication process. The 4WHS may be in accordance with IEEE 802.11i, although this is not a requirement.

In operation 201, the mobile device 102 may be configured to establish a TLS session with a sign-up server 106 through the Wi-Fi hotspot 104 to receive the certificate of the sign-up server 106. The certificate may be a hotspot 2.0 certificate that may be issued by a hotspot 2.0 certificate authority (i.e., a Root Trust) and may be referred to as a root certificate.

In some embodiments, the mobile device 102 may establish the TLS session in operation 201 with the sign-up server 106 in accordance with the procedures of RFC 2560 and may perform server-side authentication using HTTPS. In some embodiments, after establishing the TLS session with the sign-up server 106, the mobile device 102 may verify that the certificate of the sign-up server 106 has been signed by a Hotspot 2.0 trust root. When the mobile device 102 verifies or is able to verify that the certificate of the sign-up server 106 has been signed by the Hotspot 2.0 root trust, the mobile device 102 may be configured to perform operation 202 to initiate new subscription establishment.

Embodiments disclosed herein are applicable to both open networks as well as a secure 802.1x type of a network since a TLS session is established for credentials provisioning. Thus, the same process described below may be used for both open/unsecure Wi-Fi networks and secure Wi-Fi networks (e.g., with 802.1x security).

In some embodiments, to verify that the certificate of the sign-up server 106 has been signed by a Hotspot 2.0 root trust, the mobile device 102 may use a public key of the Hotspot 2.0 root trust to verify the certificate. The public key may be obtained from a key server or from a storage element within the mobile device 102. When the mobile device 102 is unable to verify that the sign-up server's certificate has been signed by a Hotspot 2.0 root trust, or when the sign-up server's certificate has not been signed by a Hotspot 2.0 root trust, the mobile device 102 may abort the on-line sign-up and provisioning process and release/end the established TLS session.

In operation 202, the mobile device 102 may send an OMA-DM package 1 message (i.e., a client-initiated message) to the sign-up-server 106. The OMA-DM package 1 message may include device information and a generic alert that is set to subscription creation. The generic alert of this OMA-DM package 1 message may indicate that the user of the mobile device 102 wishes to establish a new subscription with the service provider. The package 1 message may be sent over a wireless link 103 (FIG. 1) implementing the TLS session.

In operation 203, the mobile device 102 may receive from the sign-up-server 106 an OMA-DM package 2 message that includes a Launch-Browser-to-URL command for execution by the mobile device 102 in response to the package 1 message. In these embodiments, the OMA-DM package 2 message received in operation 203 is a response message that is received in response to the package 1 message sent in operation 202. The OMA-DM package 1 message sent in operation 202 is a request message. The use of the OMA-DM protocol may provide for these response and request messages.

In some embodiments, the sign-up server 106 may indicate in the OMA-DM package 2 message received in operation 203 the type of credentials to be provisioned (e.g., username/password credentials, SIM-type credentials or certificate-based credentials). For example, some service providers may require certificate-based credentials, while other service providers may only require username/password credentials. When username/password credentials are to be provisioned, a username and password may be generated by the sign-up server 106 and are later returned as part of the subscription MO received. On the other hand, when certificate-based credentials are to be provisioned, a subscription certificate issued by the certificate enrollment server is returned in operation 208 and the subscription MO is received in operation 211. These embodiments are described in more detail below.

In some embodiments, the OMA-DM package 2 message received in operation 203 that includes the Launch-Browser-to-URL command may be generated by the sign-up server 106 in response to receipt of the OMA-DM package 1 message sent by the mobile device 102 in operation 202. The OMA-DM package 2 message may be received in operation 203 over the wireless link 103 implementing the established TLS session.

In operation 204, the mobile device 102 may establish, upon receipt of the OMA-DM package 2 message, a HTTPS connection to a URL identified in the OMA-DM package 2 message by executing the Launch-Browser-to-URL command and may send an HTTPS GET request over the HTTPS connection to the identified URL. The URL may be associated with the activation portal 108 (FIG. 1). The HTTPS GET request may be configured to retrieve a URL from the activation portal 108 for subscription establishment. The activation portal 108 may be associated with the particular service provider.

In operation 205, the mobile device 102 may exchange information over the established HTTPS connection with the activation portal 108 to provision credentials for a subscription for Wi-Fi network access and create the subscription MO. In some embodiments, exchanging information in operation 205 includes providing information about the user (e.g., user identification information), selecting appropriate subscription/rate plans, providing payment information (e.g., credit card or other payment information) if required and establishing policy and other appropriate parameters.

When the subscription credentials are provisioned successfully, the mobile device 102 may receive, in operation 206, an indication from the sign-up server 106 that subscription credentials were provisioned successfully along with the URL from which the subscription MO can be retrieved. The URL may be received as part of an HTTPS response message. When the subscription credentials were not provisioned successfully, operation 213 may be performed.

In operation 207, the mobile device 102 may send an OMA-DM package 3 message to the sign-up server 106 to retrieve a URL of a certificate enrollment server. The OMA-DM package 3 message may include a generic alert that is configured depending on whether certificate enrollment with the service provider is being performed. The generic alert of the OMA-DM package 3 message may indicate that the user of the mobile device 102 is not performing certificate enrollment with the service provider (e.g., the generic alert may be set to OMA-DM sign-up server). If there is an error in establishment of the new subscription, operation 213 may be performed.

When certificate enrollment is not being performed, the mobile device may receive, in operation 208, an OMA-DM package 4 message from the sign-up server 106. When certificate enrollment is not being performed, the OMA-DM package 4 message may include an ADD command and indicate a location on an OMA-DM tree of the mobile device 102. In response to the ADD command, the mobile device 102 may be configured to add the subscription MO to the location on the OMA-DM tree of the mobile device 102.

Figure 3:
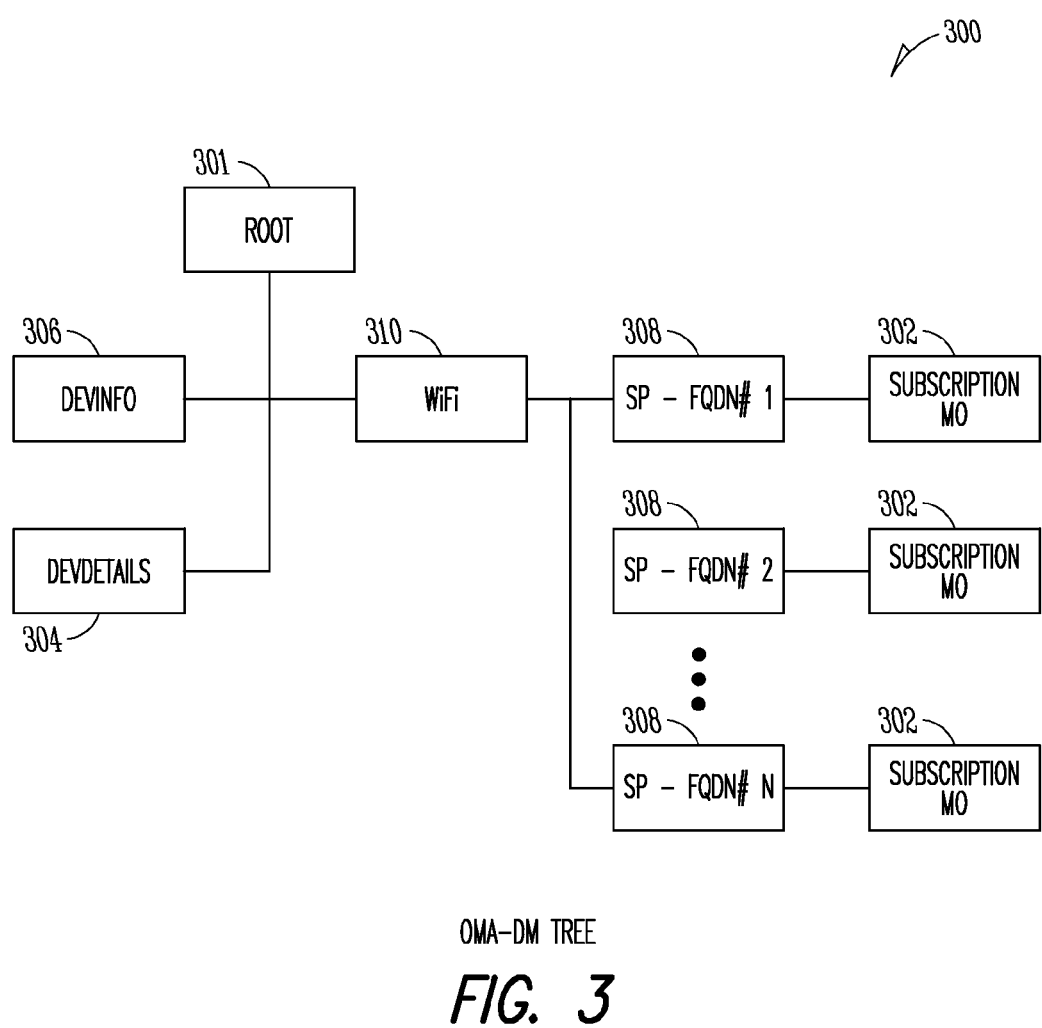
FIG. 3 illustrates an OMA-DM tree in accordance with some embodiments.

FIG. 3 illustrates an OMA-DM tree in accordance with some embodiments. OMA-DM tree 300 may be stored in mobile device 102 and may include tree root 301, a subscription MO 302 for each service provider (SP) as well as the FQDN 308 for each service provider. The OMA-DM tree 300 may also include a device information MO 306 (DEVINFO) and a device detail MO 304 (DEVDETAILS). The OMA-DM package 1 message sent in operation 202 includes the device information MO 306 and the device detail MO 304. The OMA-DM tree 300 may also include Wi-Fi MO 310 for device specific Wi-Fi objects.

In sonic embodiments, the device detail MO 304 may include device information such as model, vendor info, type of adaptor, adaptor configuration, etc. and user information. The device detail MO 304 may include additional information such as URI (uniform resource identifier) from where additional info specific to device may be obtained, device type (e.g., PC Card, USB (Universal Serial Bus), modem, express card, gaming device, music player, navigation device), OEM (Original Equipment Manufacturer) name, firmware version, software version, hardware version and whether the host device supports OMA-DM large object handling. The device info MO 306 may include a unique identifier (e.g., the GUID (Globally Unique Identifier)) for host device, a manufacturer identifier, device model, OMA-DM client version identifier, and the language setting of the host device.

In accordance with embodiments, to support the activation and provisioning process, hotspot 2.0 uses the OMA-DM client as a building block in the activation and provisioning process. The device management client 125 of mobile device 102 may be configured to support a standard OMA-DM bootstrap which may enable the device management client 125 to receive device management account updates and start a conversation with OMA-DM servers in a Wi-Fi network. The device management client 125 may be configured to download firmware updates for the mobile device 102. The device management client 125 may be responsible for OMA-DM tree exchanges between the mobile device 102 using a device management tree in XML (Extensible Markup Language). The device management client 125 may also be configured with credential/policy provisioning firmware and configured to perform device configuration updates between client and the OMA DM server (e.g., sign-up server 106), as well as for collection of device diagnostics information for a diagnostics server.

Referring back to FIG. 2, when certificate enrollment is not being performed and after the subscription MO 302 (that included username/password credentials) is added to the OMA-DM tree 300 of the mobile device 102, the mobile device 102 may release the previously established TLS session in operation 214 and may de-associate with the Wi-Fi Hotspot 104 in operation 215. The subscription MO 302 is now available for use by the mobile device 102 to automatically connect and associate with a Wi-Fi network in operation 216 which may be operated by the service provider as well as those operated by roaming partners. In some embodiments, the mobile device 102 may be configured to use the same Service Set Identification or Homogeneous Extended Service Set Identification SSID/HESID) to associate to the Wi-Fi network with the newly obtained credentials (i.e., establish a new Layer 2 and/or Layer 3 (L2/L3), connection).

When certificate enrollment is being performed, the generic alert of the OMA-DM package 3 message sent in operation 207 may be set to 'certificate enrollment'. In these embodiments, the user of the mobile device 102 wishes to perform certificate enrollment with the service provider. The OMA-DM package 4 message received in operation 208 in response may include a command-to-URL for certificate enrollment (e.g., Execute: CertificateEnrollToURL) to cause the mobile device 102 to connect to the certificate enrollment server 110 (FIG. 1) for certificate enrollment.

In response to receipt of the OMA-DM package 4 message received in operation 208, the mobile device 102 may be configured to execute the command-to-URL for certificate enrollment to perform certificate enrollment in operation 209 with the certificate enrollment server 110 that is indicated by the URL. The certificate enrollment procedure may be performed in accordance with a certificate-enrollment protocol (e.g., certificate-management protocol (CMP) or simple certificate enrollment protocol (SCEP)) to provision the mobile device 102 with a subscription certificate for authentication with the service provider.

In some embodiments, the certificate enrollment process may be configured to take less than sixty seconds under typical conditions. Typical conditions may include when the Wi-Fi hotspot and the core network of the service provider core are not congested and the certificate enrollment server 110 is not overloaded. At the end of a successful procedure, the mobile device 102 will have been provisioned a subscription certificate that is used for authentication with the network of that service provider. When unsuccessful, the mobile device will be notified of certificate enrollment failure.

The subscription certificate received in operation 209 may be an X.509 type certificate suitable for use for EAP-TLS based authentication with a network. In some embodiments, the subscription certificate may be an x.509v3 certificate and may be configured in accordance with an ITU-T (Telecommunication Standardization Sector of the International Telecommunication Union) standard for a public key infrastructure (PM) for single sign-on (SSO) and Privilege Management Infrastructure (PMI).

In operation 210, the mobile device 102 may send, if certificate enrollment is successful, an OMA-DM package 3 message to the sign-up server 106. The OMA-DM package 3 may include a generic alert containing the URL received in operation 206 from which the subscription MO can be retrieved.

In operation 211, the mobile device 102 may receive an OMA-DM package 4 message from the sign-up server 106 that includes an ADD command and a location. The OMA-DM package 4 message may be a response message that is received in response to the OMA-DM package 3 message sent by the mobile device 102 in operation 210. In response to the ADD command, the mobile device 102 may add the subscription MO 302 to the indicated location on the OMA-DM tree 300 of the mobile device 102.

When username/password credentials are provisioned, the username and password generated by the sign-up server 106 are returned as part of the subscription MO received in operation 211. When certificate-based credentials are provisioned, the certificates issued by the certificate enrollment server 110 are returned in operation 209 and the subscription MO is received in operation 211.

In operation 212, the mobile device 102 may send an OMA-DM package 3 message indicating the status of operation 211. This message may confirm that the mobile device 102 was able to add the subscription MO 302 to its OMA-DM tree 300. In some embodiments, the subscription MO 302 may include a reference to the type of credentials required by the service provider.

In operation 213, the mobile device 102 may receive an OMA-DM package 4 message indicating the status of operation 212. In this way, the service provider can be made aware that the mobile device has successfully added the subscription MO 302 and has been provisioned credentials.

In operation 214, the mobile device may release the established TLS session that was established in operation 201 and may disassociate with the Wi-Fi network in operation 215. In operation 216, the mobile device may use the subscription MO 302 to associate and authenticate with a Wi-Fi network.

In some embodiments, operations 200-216 may be performed without user intervention and may be performed automatically. In some embodiments, all operations 200-216, (except possibly portions of operation 205) may be performed without user intervention and may be performed automatically.

Figure 4:
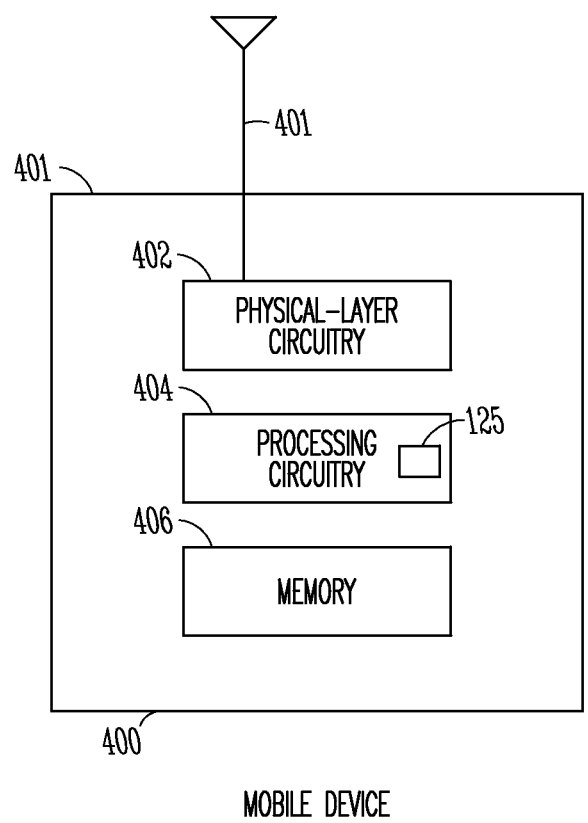
FIG. 4 illustrates a mobile device in accordance with some embodiments.

FIG. 4 illustrates a mobile device in accordance with some embodiments. Mobile device 400 may be suitable for use as mobile device 102 and may be configured to perform the various operations discussed above for secure on-line sign-up and provisioning of credentials.

Mobile device 400 may include physical-layer circuitry 402 configured for wireless communications with Wi-Fi hot spots, such as Wi-Fi hotspot 104 (FIG. 1) using one or more of antennas 401. Mobile device 400 may also include processing circuitry 404, which may be configured for performing the operations described herein along with memory 406 for storing, among other things, the provisioned credentials and a subscription MO 302 (FIG. 3) as well as the other elements of the OMA-DM tree 300 (FIG. 3). The processing circuitry 404 may be configured to implement a device management client 125 (FIG. 1) for performing a device-management protocol, such as the OMA-DM protocol and perform various operation described herein including responsibility for implementing the OMA-DM client operations. Mobile device 400 may also include other functional elements, such as media-access control (MAC) layer circuitry for media access control for performing other operations.

In the case of a single-mode mobile device, the physical layer circuitry 402 may be configured for communicating with Wi-Fi networks. In dual-mode embodiments, the physical layer circuitry 402 may be configured for communicating with both cellular networks and Wi-Fi networks. In dual-mode embodiments, the mobile device 400 may include both a Wi-Fi transceiver and one or more cellular network transceivers. In dual-mode embodiments, the mobile device 400 may also be configured to offload traffic from the cellular network to the available Wi-Fi networks.

In some embodiments, mobile device 102 may be a portable wireless communication device, such as a personal digital assistant (PDA), a laptop or portable computer with wireless communication capability, a web tablet, a wireless telephone, a smart-phone, a wireless headset, a pager, an instant messaging device, a digital camera, an access point, a television, a medical or health device, an entertainment device, or other device that may receive and/or transmit information wirelessly.

Antennas 401 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 301 may be effectively separated to take advantage of spatial diversity and the different channel characteristics that may result between each of antennas 401 and the antennas of a transmitting station.

Although the mobile device 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors and may be configured with instructions stored on a computer-readable storage device to implement the various operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for secure on-line sign-up and provisioning for Wi-Fi Hotspot 2.0 networks performed by a mobile device, the method comprising:
associating with a Wi-Fi Hotspot and establishing a transport-layer security (TLS) session with a sign-up server through the Wi-Fi Hotspot to receive a certificate of the sign-up server;
verifying that the certificate of the sign-up server has been signed by a hotspot trust root;
sending a first message to the sign-up-server, the first message including device information and a generic alert that is set to subscription creation;
receiving from the sign-up-server a second message that includes a Launch-Browser-to-URL command for execution by the mobile device in response to the first message;
establishing by the mobile device, upon receipt of the second message, a secure Hypertext Transfer Protocol (HTTPS) connection to a first URL identified in the second message and sending an HTTPS GET request over the secure HTTP connection to the identified first URL, the first URL associated with an activation portal;
exchanging information over the established secure HTTP connection with the activation portal to provision credentials for establishment of a subscription for Wi-Fi network access and creation of a subscription management object (MO);
receiving an indication from the sign-up server that the subscription was provisioned successfully along with a second URL from which the subscription MO can be retrieved, the second URL being received as part of a HTTPS response message;
retrieving the subscription MO in response to the indication that the subscription was provisioned successfully;
disassociating with the Wi-Fi Hotspot in response to retrieval of the subscription MO from the sign-up server; and
re-associating and authenticating with the Wi-Fi Hotspot, after the disassociation, using the provisioned credentials of the retrieved subscription MO.

2. The method of claim 1 wherein when the credentials for the subscription are provisioned successfully, the method includes the mobile device:
sending a third message to the sign-up server, the third message including a generic alert that is set indicate whether or not the mobile device is performing certificate enrollment with the service provider; and
receiving a fourth message from the sign-up server, when certificate enrollment is not being performed, the fourth message includes an ADD command and a location,
wherein in response to the ADD command, the mobile device is configured to add the subscription MO to the location on a tree of the mobile device.

3. The method of claim 2 wherein when certificate enrollment is being performed:
the generic alert of the third message is set to certificate enrollment,
the fourth message includes a command-to-URL for certificate enrollment for mobile device to connect to the certificate enrollment server, and
the method further includes:
executing the command-to-URL for certificate enrollment to perform certificate enrollment with the certificate enrollment server in accordance with a certificate-enrollment protocol to provision the mobile device with a subscription certificate for authentication with the service provider;
sending, if the certificate enrollment is successful, a fifth message to the sign-up server, the fifth message including a generic alert containing the URL from which the subscription MO can be retrieved; and
receiving a sixth message from the sign-up server, the sixth message including an ADD command and a location,
wherein in response to the ADD command, the mobile device is configured to add the subscription MO for certificate based credentials to the location on the tree of the mobile device.

4. The method of claim 1 wherein the first message includes a device information management object (MO) and a device detail MO, and
wherein the generic alert that is set to subscription creation is to indicate that the mobile device wishes to establish a new subscription with a service provider.

5. The method of claim 4 wherein the second message indicates a type of credentials to be provisioned by the service provider, and
wherein the type of credentials includes one of username/password credentials, certificate-based credentials or SIM-type credentials.

6. The method of claim 1 wherein the HTTPS GET request is configured to retrieve a URL from the activation portal for subscription establishment, and
wherein the activation portal is associated with a service provider.

7. The method of claim 2 wherein verifying that the certificate of the sign-up server has been signed by a hotspot trust root comprises the mobile device using a public key of the hotspot trust root to verify the certificate, and
wherein when the mobile device is unable to verify that the sign-up server's certificate has been signed by a hotspot trust root, the mobile device is configured to abort the on-line sign-up and provisioning process and release/end the established TLS session.

8. The method of claim 2 wherein the mobile device establishes the TLS session with the sign-up server in accordance with the procedures of RFC 2560 and performs server-side authentication using HTTPS.

9. The method of claim 2 wherein the second message that includes the Launch-Browser-to-URL command is generated by the sign-up-server in response to receipt of the first message.

10. The method of claim 2 wherein exchanging information with the activation portal to provision the subscription for Wi-Fi network access includes providing information about the user, selecting appropriate subscription plans, providing payment information when required and establishing policy and other appropriate parameters.

11. The method of claim 2 wherein operations for secure on-line sign-up and provisioning of credentials are performed automatically without user intervention.

12. The method of claim 3 wherein the first message, the second message, the third message and the fourth message correspond to an Open Mobile Alliance Device Management (OMA-DM) package 1 message, an OMA-DM package 2 message, an OMA-DM package 3 message and an OMA-DM package 4 message, respectively, configured in accordance with OMA-DM specification version 1.2, and
wherein the fifth message and the sixth message correspond to an OMA-DM package 3 message and an OMA-DM package 4 message, respectively, configured in accordance with OMA-DM specification version 1.2.

13. A mobile device configured for secure on-line sign-up and provisioning of credentials for Wi-Fi hotspot networks, the mobile device configured to:
associate with a Wi-Fi Hotspot and establish a transport-layer security (TLS) session with a sign-up server through the Wi-Fi Hotspot to receive a certificate of the sign-up server;
verify that the certificate of the sign-up server has been signed by a hotspot trust root;
when the certificate has been verified, the mobile device is further configured to:
send a first message to the sign-up-server, the first message including device information and a generic alert that is set to subscription creation;
receive from the sign-up-server a second message that includes a Launch-Browser-to-URL command for execution by the mobile device in response to the first message;
establish by the mobile device, upon receipt of the second message, a secure Hypertext Transfer Protocol (HTTPS) connection to a first URL identified in the second message;
send an HTTPS GET request over the secure HTTP connection to the identified first URL, the first URL associated with an activation portal;
exchange information over the established secure HTTP connection with the activation portal to provision credentials for establishment of a subscription for Wi-Fi network access and creation of a subscription management object (MO);
receive an indication from the sign-up server that the subscription was provisioned successfully along with a second URL from which the subscription MO can be retrieved, the second URL being received as part of a HTTPS response message;
retrieve the subscription MO in response to the indication that the subscription was provisioned successfully, wherein the subscription MO includes a reference to provisioned credentials for retrieval and storage in a device management tree of the mobile device;
disassociate with the Wi-Fi Hotspot in response to retrieval of the subscription MO from the sign-up server; and
re-associating and authenticating with the Wi-Fi Hotspot, after the disassociation, using the provisioned credentials of retrieved subscription MO.

14. The mobile device of claim 13 wherein when certificate-based credentials are to be provisioned, the mobile device is further configured to launch a certificate-enrollment protocol for provisioning of the certificate-based credentials.

15. The mobile device of claim 13 wherein the first message and the second message correspond to an Open Mobile Alliance Device Management (OMA-DM) package 1 message and an OMA-DM package 2 message respectively configured in accordance with OMA-DM specification version 1.2.

16. A method for operating a sign-up server for secure on-line signup and provisioning of credentials to a mobile device for Wi-Fi hotspot connectivity, the method comprising:
establishing a transport-layer security (TLS) session with the mobile device after the mobile device has associated with a Wi-Fi Hotspot;
providing a certificate of the sign-up server to the mobile device, the certificate of the sign-up server being verified as being signed by a hotspot trust root;
receiving a first message from the mobile device over a transport layer security (TLS) session, the OMA DM first message including device information and a generic alert that is set to subscription creation;
sending to the mobile device a second message that includes a Launch-Browser-to-URL command for execution by the mobile device in response to the first message;
establishing a secure Hypertext Transfer Protocol (HTTPS) connection with the mobile device and receiving an HTTPS GET request over the secure HTTP connection to the identified URL, the URL associated with an activation portal;

exchanging information over the established secure HTTP connection to provision credentials for establishment of a subscription for Wi-Fi network access and creation of a subscription management object (MO);

sending an indication from the sign-up server to the mobile device that the subscription was provisioned successfully along with a second URL from which the subscription MO can be retrieved, the second URL being received as part of a HTTPS response message; and providing to the mobile device a subscription MO that includes a reference to provisioned credentials for retrieval and storage in a device management tree of the mobile device, the provided subscription MO enabling the mobile device to disassociate with the Wi-Fi Hotspot in response to retrieval of the subscription MO from the sign-up server and re-associate and authenticate with the Wi-Fi Hotspot, after the disassociation, using the provisioned credentials of the provided subscription MO.

17. The method of claim 16 wherein when the credentials for the subscription are provisioned successfully, the method includes:

receiving a third message from the mobile device that includes a generic alert set to indicate whether or not the mobile device is not performing certificate enrollment with the service provider;

sending a fourth message to the mobile device from the sign-up server, wherein when certificate enrollment is not being performed, the fourth message includes an ADD command and a location, and wherein in response to the ADD command, the mobile device is configured to add the subscription MO to the location on a tree of the mobile device.

18. The method of claim 17 wherein when certificate enrollment is being performed:

the generic alert of the third message is set to certificate enrollment, the fourth message includes a command-to-URL for certificate enrollment for mobile device to connect to a certificate enrollment server to provision the mobile device with a subscription certificate for authentication with the service provider.

19. The method of claim 18 further comprising:

receiving, if the certificate enrollment is successful, a fifth message from the mobile device, the fifth message including a generic alert containing the URL from which the subscription MO can be retrieved; and sending a sixth message to the mobile device, the sixth message including an ADD command and a location, wherein in response to the ADD command, the mobile device is configured to add the subscription MO for certificate based credentials to the location on the tree of the mobile device.

20. The method of claim 17 wherein the first message, the second message, the third message and the fourth message correspond to an Open Mobile Alliance Device Management (OMA-DM) package 1 message, an OMA-DM package 2 message, an OMA-DM package 3 message and an OMA-DM package 4 message, respectively, configured in accordance with OMA-DM specification version 1.2, and wherein the fifth message and the sixth message correspond to an OMA-DM package 3 message and an OMA-DM package 4 message, respectively, configured in accordance with OMA-DM specification version 1.2.

* * * * *

UNITED STATES PATENT AND TRADEMARK OFFICE
CERTIFICATE OF CORRECTION

PATENT NO. : 9,571,482 B2
APPLICATION NO. : 13/188205
DATED : February 14, 2017
INVENTOR(S) : Gupta et al.

Page 1 of 1

It is certified that error appears in the above-identified patent and that said Letters Patent is hereby corrected as shown below:

On the Title Page

In item (54), in "Title", in Column 1, Line 3, delete "DEVICE MANAGEMENT" and insert --DEVICE-MANAGEMENT-- therefor In item (75), in "Inventors", in Column 1, Line 2, delete "Necatl" and insert --Necati-- therefor On page 2, in Column 2, under "Other Publications", Line 6, delete ""Interational" and insert --"International-- therefor On page 2, in Column 2, under "Other Publications", Line 6, delete "Writtion" and insert --Written-- therefor In the Specification In Column 1, Line 3, delete "DEVICE MANAGEMENT" and insert --DEVICE-MANAGEMENT-- therefor Signed and Sealed this
Twenty-eighth Day of May, 2019

Andrei Iancu
*Director of the United States Patent and Trademark Office*